US009253086B2

(12) United States Patent
Ramanathan et al.

(10) Patent No.: US 9,253,086 B2
(45) Date of Patent: Feb. 2, 2016

(54) METHOD AND SYSTEM OF DYNAMIC NEXT-HOP ROUTING

(71) Applicant: Telefonaktiebolaget L M Ericsson (publ), Stockholm (SE)

(72) Inventors: Selvam Ramanathan, Sunnyvale, CA (US); Neelesh Bansod, Sunnyvale, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 157 days.

(21) Appl. No.: 13/938,104

(22) Filed: Jul. 9, 2013

(65) Prior Publication Data

US 2015/0016456 A1      Jan. 15, 2015

(51) Int. Cl.
*H04L 12/721* (2013.01)
*H04L 12/725* (2013.01)

(52) U.S. Cl.
CPC .............. *H04L 45/72* (2013.01); *H04L 45/306* (2013.01)

(58) Field of Classification Search
CPC ............................................... H04L 2012/5668
See application file for complete search history.

(56) References Cited

U.S. PATENT DOCUMENTS

| | | | |
|---|---|---|---|
| 7,489,681 B1 * | 2/2009 | Aggarwal et al. | 370/389 |
| 2002/0172203 A1 * | 11/2002 | Ji et al. | 370/392 |
| 2004/0202177 A1 * | 10/2004 | Tachikawa | 370/395.1 |
| 2005/0131912 A1 * | 6/2005 | Lin et al. | 707/100 |
| 2009/0109852 A1 * | 4/2009 | Grover et al. | 370/235 |
| 2009/0141724 A1 * | 6/2009 | Aggarwal et al. | 370/392 |
| 2009/0285089 A1 * | 11/2009 | Srinivasan | 370/218 |
| 2011/0305239 A1 * | 12/2011 | Chandrashekharachar Suvarneshwar | 370/390 |
| 2012/0182996 A1 * | 7/2012 | Aggarwal et al. | 370/392 |
| 2014/0211800 A1 * | 7/2014 | Chunduri et al. | 370/392 |

OTHER PUBLICATIONS

Le Faucheur, F., et al., "Advertising IPv4 Network Layer Reachability Information with an IPv6 Next Hop", Network Working Group, RFC 5549, May 2009, 11 pages.
Luciani, J., et al., "NBMA Next Hop Resolution Protocol (NHRP)", Network Working Group, RFC 2332, Apr. 1998, 53 pages.
J. Postel, "User Datagram Protocol," Aug. 28, 1980, 3 pages. RFC: 768.

(Continued)

*Primary Examiner* — Gregory Sefcheck
*Assistant Examiner* — Suk Jin Kang
(74) *Attorney, Agent, or Firm* — Nicholson De Vos Webster & Elliott LLP

(57) ABSTRACT

A method implementing dynamic next-hop routing at a network device is disclosed. The network device contains a routing information base (RIB) and a forwarding information base (FIB). The method starts with receiving a request to create a dynamic next-hop type using a next-hop schema. The dynamic next-hop type is for a prefix associated with an application. The next-hop schema includes a set of functions and a set of fields associated with the set of functions. The dynamic next-hop type is created using the next-hop schema at the RIB, where the set of fields associated with the set of functions of the dynamic next-hop type is processed. The created dynamic next-hop type is then downloaded to the FIB, where the set of functions of the dynamic next-hop type is processed. Afterward, an identifier associated with the dynamic next-hop type for the prefix associated with the application is returned.

14 Claims, 12 Drawing Sheets

(56) References Cited

OTHER PUBLICATIONS

"Transmission Control Sciences DARPA Internet Program Protocol Specification," Sep. 1981, 91 pages, RFC: 793, Information Sciences Institute, University of Southern California, Marina del Rey, California.
C. Hedrick, "Routing Information Protocol," Jun. 1988, 33 pages, Network Working Group, Request for Comments: 1058.
David Oran, "OSI IS-IS Intra-domain Routing Protocol," Feb. 1990, 157 pages, Network Working Group, Request for Comments: 1142.
T. Socolofsky, et al., "A TCP/IP Tutorial," Jan. 1991, 28 pages, Network Working Group, Request for Comments: 1180.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 19 pages, Network Working Group, Request for Comments: 2211.
S. Shenker, et al., "Specification of Guaranteed Quality of Service," Sep. 1997, 20 pages, Network Working Group, Request for Comments: 2212.
J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
D. Awduche, et al., "RSVP-TE: Extensions to RSVP for LSP Tunnels," Dec. 2001, 61 pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffsery Routers," May 2002, 56 pages, Network Working Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol 4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.
Z. Ali, et al., "Node-ID Based Resource Reservation Protocol (RSVP) Hello: A Clarification Statement," Jun. 2006, 7 pages, Network Working Group, Request for Comments: 4558, The Internet Society.
J. Babiarz, et al., "Configuration Guidelines for DiffSery Service Classes," Aug. 2006, 57 pages, Network Working Group, Request for Comments: 4594, The Internet Society.
K. Kompella, et al., "Virtual Private Lan Service (VPLS) Using BGP for Auto-Discovery and Signaling," Jan. 2007, 28 pages, Network Working Group, Request for Comments: 4761, The IETF Trust.
M. Lasserre, et al., "Virtual Private Lan Service (VPLS) Using Label Distribution Protocol (LDP) Signaling," Jan. 2007, 31 pages, Network Working Group, Request for Comments: 4762, The IETF Trust.
L. Anderson, et al., "LDP Specification," Oct. 2007, 135 pages, Network Working Group, Request for Comments: 5036, The IETF Trust.
R. Coltun, et al., "OSPF for IPv6," Jul. 2008, 94 pages, Network Working Group, Request for Comments: 5340, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

\* cited by examiner

METHOD AND SYSTEM OF DYNAMIC NEXT-HOP ROUTING

FIELD

The embodiments of the present invention generally relate to routing in a network, and more particularly relate to routing utilizing separate control plane and date plane.

BACKGROUND

Routing has always been a critical aspect of data networking. In routing a packet at a network device, a routing structure (e.g., a routing table) is often used. A routing structure usually contains an address (e.g., IP address) of a destination network and an address of the next gateway along the path to the network destination. The packet is routed at least partially based on the address of the next gateway. In addition, prior to routing the packet out of the network device, the packet may be processed in a variety of ways through a set of functions such as extracting certain bytes from or adding certain bytes to the packet. The next gateway is often referred to as the next-hop. Using a routing structure to store a next-hop for known destinations and applying functions to process packets is often referred to as next-hop routing.

Packets at a network device are associated with applications. Packets of one application often have a common network destination and are also processed through same set of functions. Thus, a prefix can be associated to an application so that all traffic of the application may be routed similarly. Thus, next-hop routing is a combination of next-hop and prefix.

The need of an application for packet processing changes over time and an application may add or remove functions applicable to packets of the application at a network device. When that happens, routing related modules need to be updated through changing programming routing codes and this kind of updates is time consuming, labor intensive, and/or error prone, and a better mechanism is preferred to simplify next-hop routing.

SUMMARY

A method implementing dynamic next-hop routing at a network device is disclosed. The network device contains a routing information base (RIB) and a forwarding information base (FIB). The RIB contains routing information to map routes to a set of next-hops, and the FIB contains forwarding information for the network device to forward traffic flows to next-hops. The method starts with receiving a request to create a dynamic next-hop type using a next-hop schema. The dynamic next-hop type is for a prefix associated with an application and it indicates a type of next-hop of the request. The next-hop schema includes a set of functions and a set of fields associated with the set of functions. The method continues with creating the dynamic next-hop type using the next-hop schema at the RIB, where the set of fields associated with the set of functions of the dynamic next-hop type is processed. The created dynamic next-hop type is then downloaded from the RIB to the FIB, where the set of functions of the dynamic next-hop type is processed. Afterward, an identifier associated with the dynamic next-hop type for the prefix associated with the application is returned.

A network device implementing dynamic next-hop routing is disclosed. The network device contains a routing information base (RIB) and a forwarding information base (FIB). The RIB contains routing information to map routes to a set of next-hops, and the FIB contains forwarding information for the network device to forward traffic flows to next-hops. The network device includes an application processor configured to send a request to create a dynamic next-hop type using a next-hop schema. The dynamic next-hop type is for a prefix associated with an application and it indicates a type of next-hop of the request. The next-hop schema includes a set of functions and a set of fields associated with the set of functions. The network device also includes a route controller configured to receive the request, and a first storage device coupled with the route controller, where the first storage device contains the RIB. The route controller is configured to create the dynamic next-hop type using the next-hop schema at the RIB, where the set of fields associated with the set of functions of the dynamic next-hop type is processed. The network device also contains a second storage coupled to the first storage. The second storage contains the FIB, and the FIB downloads the created dynamic next-hop. The network device further includes a traffic forwarder coupled with the second storage device. The traffic forwarder is configured return an identifier associated with the dynamic next-hop type for the prefix associated with the application once processing the set of functions of the dynamic next-hop at the FIB is complete.

A method implementing dynamic next-hop routing at a network containing a network controller and a traffic forwarding element is disclosed. The network controller contains a routing information base (RIB) and the traffic forwarding element contains a forwarding information base (FIB). The RIB contains routing information to map routes to a set of next-hops, and the FIB contains forwarding information for the network device to forward traffic flows to next-hops. The method starts with receiving a request at the network controller to create a dynamic next-hop type using a next-hop schema. The dynamic next-hop type is for a prefix associated with an application and it indicates a type of next-hop of the request. The next-hop schema includes a set of functions and a set of fields associated with the set of functions. The method continues with creating the dynamic next-hop type using the next-hop schema at the RIB, where the set of fields associated with the set of functions of the dynamic next-hop type is processed. The created dynamic next-hop type is then downloaded from the RIB to the FIB, where the set of functions of the dynamic next-hop type is processed at the traffic forwarding element. Afterward, an identifier associated with the dynamic next-hop type for the prefix associated with the application is returned.

A plurality of network devices implementing dynamic next-hop routing is disclosed. The plurality of network devices includes a network controller and a traffic forwarding element, which contains a RIB and a FIB respectively. The RIB contains routing information to map routes to a set of next-hops, and the FIB contains forwarding information for the network device to forward traffic flows to next-hops. The network controller includes an application processor configured to send a request to create a dynamic next-hop type using a next-hop schema. The dynamic next-hop type is for a prefix associated with an application and it indicates a type of next-hop of the request. The next-hop schema includes a set of functions and a set of fields associated with the set of functions. The network controller also includes a route controller configured to receive the request, and a first storage device coupled with the route controller, where the first storage device contains the RIB. The route controller is configured to create the dynamic next-hop type using the next-hop schema at the RIB, where the set of fields associated with the set of functions of the dynamic next-hop type is processed. The traffic forwarding element contains a second storage coupled to the first storage. The second storage contains the FIB, and the FIB downloads the created dynamic next-hop. The traffic forwarding element further includes a traffic forwarder coupled with the second storage device. The traffic forwarder is configured return an identifier associated with the dynamic next-hop type for the prefix associated with the application once processing the set of functions of the dynamic next-hop at the FIB is complete.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
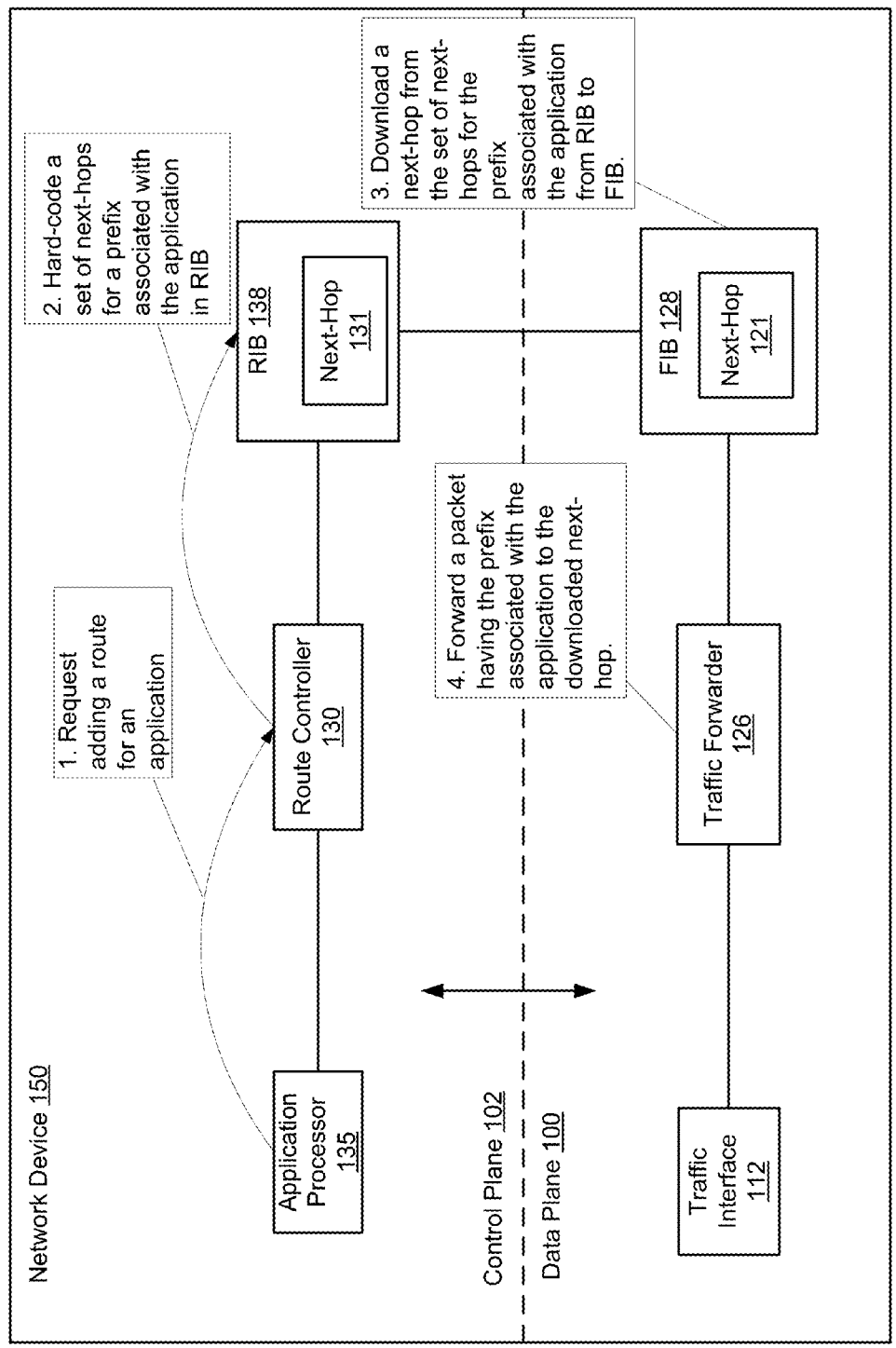
FIG. 1 illustrates next-hop routing performed in prior art.

In the following description, numerous specific details are set forth. However, it is understood that embodiments of the invention may be practiced without these specific details. In other instances, well-known circuits, structures and techniques have not been shown in detail in order not to obscure the understanding of this description.

It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next-hop for the data and the outgoing port for that data), and the data plane is in charge of forwarding that data. For example, the control plane typically includes one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network devices to exchange routes and select those routes based on one or more routing metrics. In addition, the control plane also typically includes ISO layer 2 control protocols such as Rapid Spanning Tree Protocol (RSTP), Multiple Spanning Tree Protocol (MSTP), and SPB (Shortest Path Bridging), which have been standardized by various standard bodies.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network device), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). Nodes are implemented in network devices. A physical node is implemented directly on the network device, whereas a virtual node is a software, and possibly hardware, abstraction implemented on the network device. Thus, multiple virtual nodes may be implemented on a single network device.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (a network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Some network devices provide support for implementing VPNs (Virtual Private Networks) (e.g., Layer 2 VPNs and/or Layer 3 VPNs). For example, the network device where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other network devices). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge network device that supports multiple contexts may be deployed as a PE; and a context may be configured with a VPN protocol, and thus that context is referred as a VPN context.

Some network devices provide support for VPLS (Virtual Private LAN Service) (RFC 4761 and 4762). For example, in a VPLS network, subscriber end stations access content/services provided through the VPLS network by coupling to CEs, which are coupled through PEs coupled by other network devices. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow subscriber end stations that are coupled with CEs at separate geographical locations to communicate with each other across a Wide Area Network (WAN) as if they were directly attached to each other in a Local Area Network (LAN) (referred to as an emulated LAN).

Terms

The following terms are used in the description.

Routing Information Base (RIB): The structure storing routes and adjacencies information for packet routing. RIB is generally associated with traditionally control plane related functionalities. RIB in this specification includes so called Label Information Base (LIB) and other adjacency structures performing the function of packet routing.

Forwarding Information Base (FIB): The structure storing routes and adjacencies information for packet forwarding. FIB is generally associated with traditionally data plane related functionalities. FIB generally contains a subset of what a corresponding RIB contains. FIB in this specification includes so called Label Forwarding Information Base (LFIB) and other adjacency structure performing the function of packet forwarding.

Next-Hop Routing in Prior Art

For routing within a network, typically routes and adjacencies are stored in one or more RIBs on the control plane. The control plane programs the data plane with information (e.g., adjacency and route information) based on the routing structures within RIBs. For example, the control plane programs the adjacency and route information into one or more FIBs on the data plane. The data plane uses these forwarding and adjacency structures when forwarding traffic.

Each of the routing protocols may download route entries to a main RIB based on certain route metrics (the metrics can be different for different routing protocols). Each of the routing protocols can store the route entries, including the route entries that are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane into a FIB. The RIB module can also cause routes to be redistributed between routing protocols. For layer 2 forwarding, the network device can store one or more bridging tables that are used to forward data based on the layer 2 information in that data.

FIG. 1 illustrates next-hop routing performed in prior art. Network device 150 is logically separately into control plane 102 and data plane 100. Control plane 102 generally determines how packets are supposed to be routed, and data plane 100 generally forwards the packets based on the determination. Note however, the functional separation between control plane and data plane differ significantly according to implementation and hardware availability, and while one separation is illustrated in FIG. 1, many other separations are feasible.

Application processor 135 is an entity within control plane 102. Application processor 135 interacts with applications requesting routes at network device 150. Applications (sometimes referred to as clients) include IP routing protocols (e.g., OSPF, IS-IS, ARP, ND) and IP services (e.g., packet inspection and service classification). Application processor 135 sends out requests for applications and receives responses for the requests.

Route controller 130 is another entity within control plane 102. Route controller 130 provides mechanisms enabling applications to add routes. Routes are stored in RIB 138. Each route represents a traffic flow routing based on a destination of the traffic flow. Next-hop 131 represents an entry within routing table that maps routes to a set of next-hops. Note each next-hop include a type of operations and parameters associated with the type of operations.

Selected routes of RIB 138 are downloaded to FIB 128 within data plane 100. Next-hop 121 represents an entry within FIB 138, and traffic forwarder is a processor configured to forward traffic based on information within RIB 138. Traffic interface 112 interacts with traffic received at local network device 150. Traffic interface 112 receives packets of a variety of applications. Based on next-hop 121, traffic forwarder 126 forwards the packets to selected next-hops and also process the packets using a set of functions associated with the selected next-hops.

Task boxes 1 to 4 illustrate the typical order in which operations are performed to set up next-hop routing in prior art. At task box 1, application processor 135 requests route controller 130 to add a route for an application. The request may be triggered by system starting up, operator operations, or other conditions in need of adding route for the application. Route controller 130 then programs a set of next hops for a prefix associated with the application in RIB 138. The programming is performed at source code level generally and it depends on the specifics of the application thus it is often referred to as hard-coding. From the set of next-hops, FIB 128 selects a next-hop from the set of next hops for the prefix associated with the application from RIB 138. Again, the selection is based on specifics of the application. FIB 128 also associated a set of functions to perform to the selected next-hop. At task box 4, traffic forwarder 126 determines that a received packet from traffic interface 112 having the prefix associated with the application, it performs the set of functions associated with the selected next-hop and route the traffic leaving network device 150 through traffic interface 112.

Note task boxes 1 to 3 illustrate the process of setting up next-hop routing while task box 4 illustrates the next-hop routing itself. The process of setting up next-hop routing involves coding specifically for an application at application processor 135, route controller 130, RIB 138, and FIB 128. Once the next-hop routing is set up, it is static and a specific set of functions are always performed for a given application. Yet an application may change over time. For example, packet inspection and service classification may change the set of functions it needs to perform for next-hop routing, and it may change the definition of one or more functions such as adding/removing fields associated with the set of functions. It may also change the key of next-hop that RIB 138 uses to index next-hop 131. When such change happens, the process of setting up static next-hop routing needs to be repeated at application processor 135, route controller 130, RIB 138, and FIB 128. Another set of static next-hop is set up based on the updated application. The process is time-consuming, labor-intensive, and/or error-prone since all the modules need to be programmed again in concert to make next-hop routing work properly for the updated application.

Figure 2:
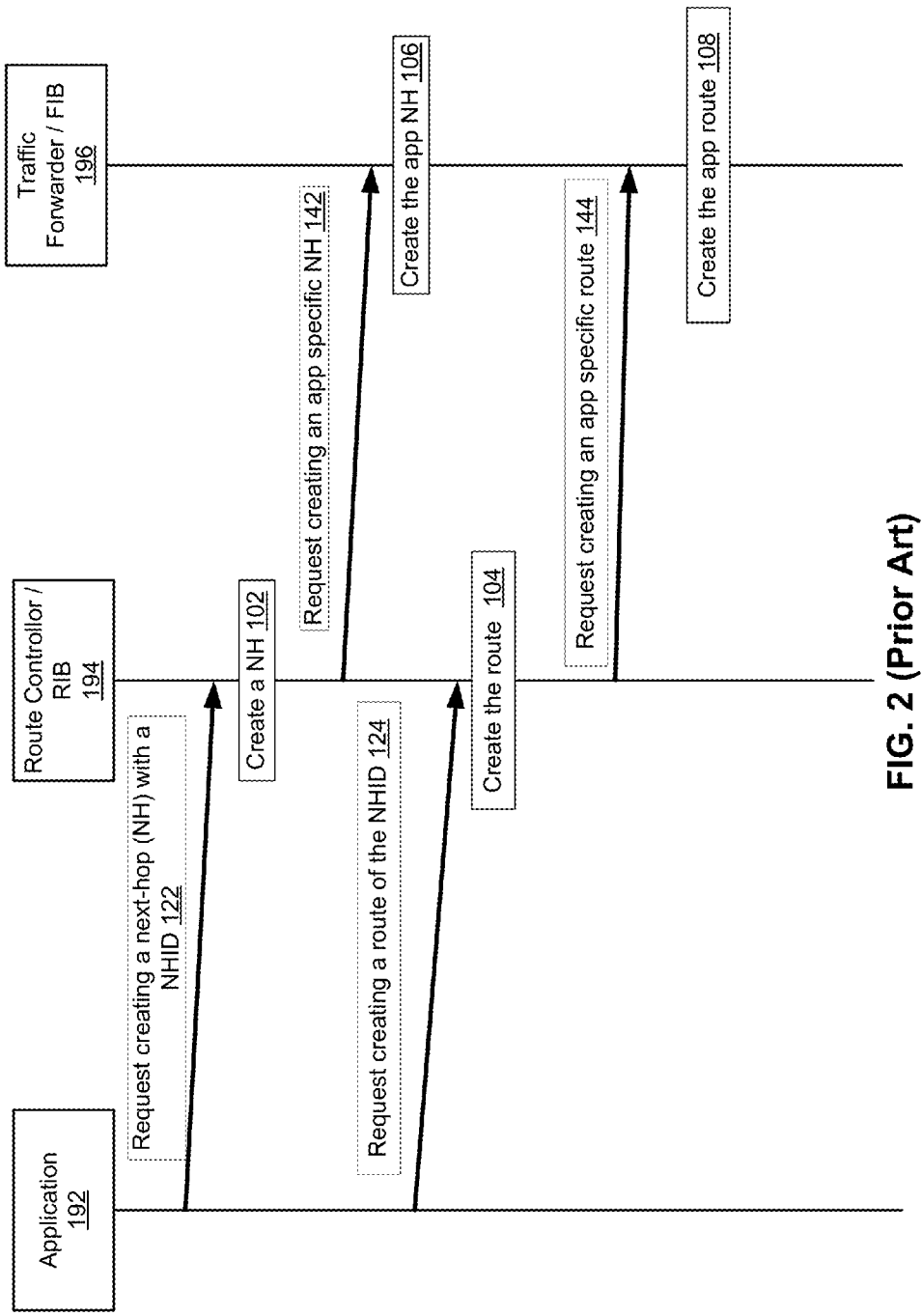
FIG. 2 illustrates a process of setting up next-hop routing in prior art.

FIG. 2 illustrates a process of setting up next-hop routing in prior art. Referring to FIG. 2, application 192 first requests a route controller and its associated RIB 194 to create a next-hop at reference 122. The request is identified with a next-hop identifier (NHID). After receiving the request, route controller creates a next-hop at its associated RIB at reference 102. It then sends a request to create a next-hop for traffic forwarding of the specific application at traffic forwarder in its associated FIB 196 at reference 142. The next-hop for the specific application is created at reference 106. Note the next-hop includes a set of functions to be performed for the packets forwarded according to the next-hop.

Then application 192 requests creating a route for the NHID at reference 124. The route is creating at the RIB by the route controller at reference 104. Note the route is a combination of next-hop and a prefix associated with the application. The process of creating route is to link the prefix associated with the application to the created next-hop. Then a request for creating a route for traffic forwarding of the specific application at traffic forwarder in its associated FIB 196 at reference 144. At reference 108, the application specific route is created.

Note the process of setting up next-hop routing is a one-way process, and application does not require feedback from route controller, RIB, or FIB for the next-hop rout creation. That is because the setting up is performed in concert. It is common that different groups of engineers work on application, route controller/RIB, and traffic/forwarder/FIB as these modules generally requires different expertise. Thus in practice, the setting up in concert requires large number of engineers cooperate intimately and this model is inflexible and does not scale well.

Embodiments of Dynamic Next-Hop Routing

The embodiments of the invention aim at reducing the complexity of setting up next-hop routing. A concept of next-hop schema is proposed to abstract out a set of functions to be performed. A next-hop schema includes a set of functions to be performed and a set of fields associated with the set of functions defined. The next-hop schema does not have data filled initially, and route controller, RIB, and FIB are configured to recognize next-hop schemas and they can perform necessary configuring/provisioning without data filled in.

The embodiments of the invention also propose a concept of dynamic next-hop type. A dynamic next-hop type is abstracted to be provisioned for a type of application. As discussed herein above, there are a variety of applications, and they can be IP routing protocols or IP services, and each can be considered as an application type, and the dynamic next-hop type can be set up to correspond to an application type.

Figure 3:
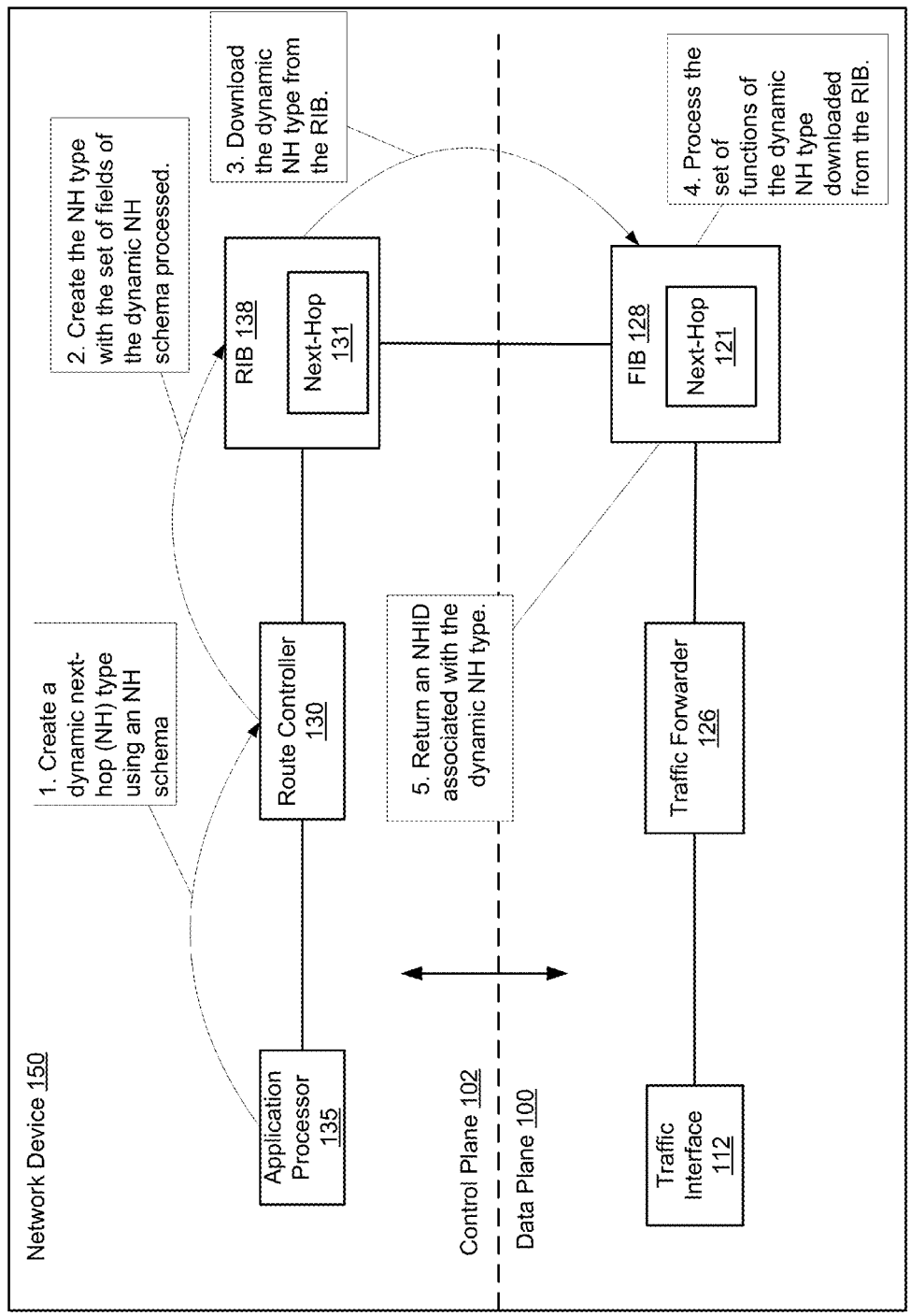
FIG. 3 illustrates setting up a dynamic next-hop type according to an embodiment of the invention.

FIG. 3 illustrates setting up a dynamic next-hop type according to an embodiment of the invention. FIG. 3 is similar to FIG. 1 and the same or similar references indicate elements or components having the same or similar functionalities. Task boxes 1 to 4 illustrate the order in which operations are performed according to the embodiment of the invention.

At task box 1, application processor 135 sends a request to route controller 130 to create a dynamic next-hop type using a next-hop schema. The dynamic next-hop type is for a prefix associated with an application, and it indicates a type of next-hop of the request. The next-hop schema includes a set of functions and a set of fields associated with the set of functions.

At task box 2, route controller 130 creates the dynamic next-hop type using the next-hop schema at RIB 138. Route controller 130 processes the set of fields associated with the set of functions of the dynamic next-hop type. Note route controller 130 and RIB 138 understand next-hop schema and they can process the set of fields associated with the set of functions even through there is no data filling in the set of fields. The dynamic next-hop type is stored in next-hop 131 of RIB 138.

At task box 3, the created dynamic next-hop type is downloaded from RIB 138 to FIB 128. Then at task box 4, FIB 128 processes the set of functions of the downloaded dynamic next-hop. Note FIB 128 understands next-hop schema, which does not contain data associated with the set of fields of the set of functions. FIB 128 finishes processing the dynamic next-hop type and create the dynamic next-hop type at FIB 128. Then it returns a next-hop identifier (NHID) associated with the dynamic next-hop type, indicating the setting up of the dynamic next-hop type is complete at task box 5. The NHID will be accessible by applications.

Note that the setting up of the dynamic next-hop type is for a prefix associated with an application, but there is no request of the application instance to set up the dynamic next-hop type yet. For example, a dynamic next-hop type is for an IP service application, and the IP service application is defined to include two fields within an associated extracting function. The created dynamic next-hop is the IP service application (identified by an NHID), even though the two fields do not have data filled in yet and router controller 130, RIB 138, and FIB 128 cannot process a packet of the IP service application yet. For that to happen, an instance of the application needs to provide data for the two fields.

Figure 4:
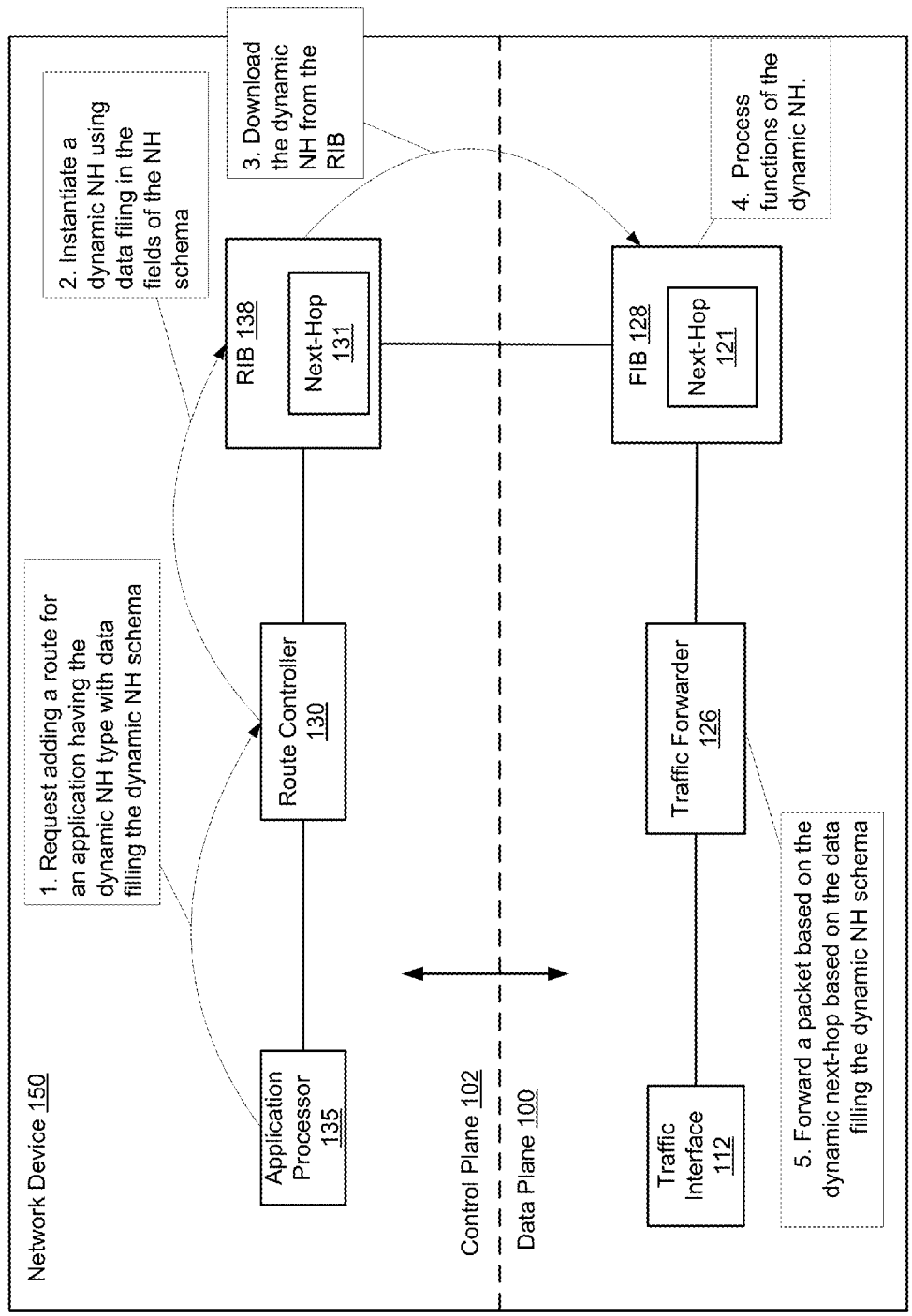
FIG. 4 illustrates instantiating a dynamic next-hop type according to an embodiment of the invention.

FIG. 4 illustrates instantiating a dynamic next-hop type according to an embodiment of the invention. FIG. 4 may be viewed as a continuation of FIG. 3 and the dynamic next-hop type has been set up already before the process illustrated by task boxes 1 to 4 begins.

At task box 1, application processor sends a request to add route for an application. The application having the NHID of a dynamic next-hop type that already set up (through the process illustrated in FIG. 3 for example). The application also contains data to fill in the set of fields of the next hop schema through which the dynamic next-hop is set up. That is, the data associated with the application is now provided as an instance of the application.

At task box 2, route controller 130 instantiates a dynamic next hop of the dynamic next-hop type using the data to fill in the set of fields of the next-hop schema at RIB 138. Then at task box 3, the dynamic next-hop at RIB 138 is downloaded to FIB 128. At task box 4, FIB 128 processes the set of functions of the next-hop schema using the data to fill in the set of fields of the next-hop schema. Then at task box 5, when a packet is received from traffic interface 112 and it is related to a prefix associated with the NHID, traffic forwarder 126 will performs the set of functions of the dynamic next-hop on the packet and forward the packet outside of network device 150 to the next hop network device.

The set of functions of the next-hop schema include the functions supported in the prior art. Table 1 below includes a set of functions supported by a next-hop schema and their associated fields according to an embodiment of the invention.

TABLE 1

A Set of Functions Supported by
Next-Hop Schema In One Embodiment

| | |
|---|---|
| Extract from next-hop: extract-nexthop(X, Y) | This operation extracts X bytes of data at offset Y within the current next-hop |
| Extract from packet: extract-packet(X, Y) | This operation extracts X bytes of data at offset Y within the current packet. |
| Lookup a forwarding table: lookup-table(X, Y, Z) | Lookup a table of type X and instance Y using the key Z |
| Storing into the packet: store-packet(X, Y, Z) | Store data into the packet. In this operation the data represented by X has length Y bytes and is stored at offset Z within the packet. |
| Transmit: transmit(X) | Transmit a packet on the queue indicated by X. Note that the queue could represent a channel to another processing element (leaf port. root port, etc) at the network device. |
| Drop a packet: drop(X) | Drop the current packet with reason code X. |
| Continue processing: Continue-nexthop(X) | Continue processing the packet with another next-hop identified by X. |
| Mathematical operations | Some other mathematical operations such as concatenate, add, subtract are also needed. |
| Load Dynamic Link Library: load-library (*routine*, *lib*) | To provide support for functionalities that cannot be achieved by the basic forwarding constructs. The application implements the next-hop function in a dynamic linked library that is accessible on the data plane. The next-hop schema then identifies the routine name and the library name for the next-hop type. |

Note that in Table 1, except the load dynamic link library function, the functions are generally referred to as forwarding constructs or basic forwarding constructs and they are the functions commonly performs in next-hop routing. Through a next-hop schema, the function defines operations to be performed without providing data to complete the function. For example, to perform a drop packet function using a next-hop schema, the next-hop schema may be defined as the following:

```
// <NH-Schema> <Data>
<Type Name> = "DROP" Integer </Type><Data>
<Code>
rc = extract-nexthop(4,0)
drop (rc)
</Code>
</NH-Schema>
```

The next-hop schema for dropping a packet defines how many bytes to extract (4 bytes) and where to extra the byte (at offset 0), and using two functions (extract-nexthop( ) and drop( ), it describes operations to be performed at RIB and FIB, even though no data has been provided to the next-hop schema. This level of abstraction simplifies implementation of route controller, RIB, and FIB. Also, schema can be changed over time as long as modules such as route controller, RIB, and FIB understands the schema, they can perform operations based on changed schema. Since the next-hop schema based next-hop is dynamic and it is not statically provisioned for a particular application, embodiments of the invention modularize next-hop routing design—changes of applications can be accommodated through changes of next-hop schemas without changing at source code level of route controller, RIB, and FIB.

In addition, the set of functions of next-hop schema may include conditional operations and loops. These functions, along with functions such as continue-nexthop( ) that allows a chain of operations, make the forwarding constructs flexible and sufficient for most operations needed for next-hop routing.

In the case where forwarding constructs cannot be effectively construed to perform functions necessary for next-hop routing, embodiments of the invention proposes the load dynamic link library (DLL) function as load-library (*routine, *lib*). Load DLL provides support for functions that cannot be achieved effectively by one or more basic forwarding constructs. It allows applications to implement their own next-hop function in a dynamically linked library within the data plane.

In one embodiment, data plane needs to support Linux like dynamic libraries, and the traffic forwarder in the data plane needs to process the associated routine and library. In this embodiment, route controller and RIB performs less work while data plane (traffic forwarder and FIB) performs more. The benefit is that an application may implement arbitrarily complex next-hop functions as long as the data plane has the process power to perform the defined functions.

Note that next-hop schema based approach uses syntax to describe the step in the next-hop function. For example, variables are described to store various return values and they are used as arguments in subsequent calls (such as rc in the example above).

Figure 5:
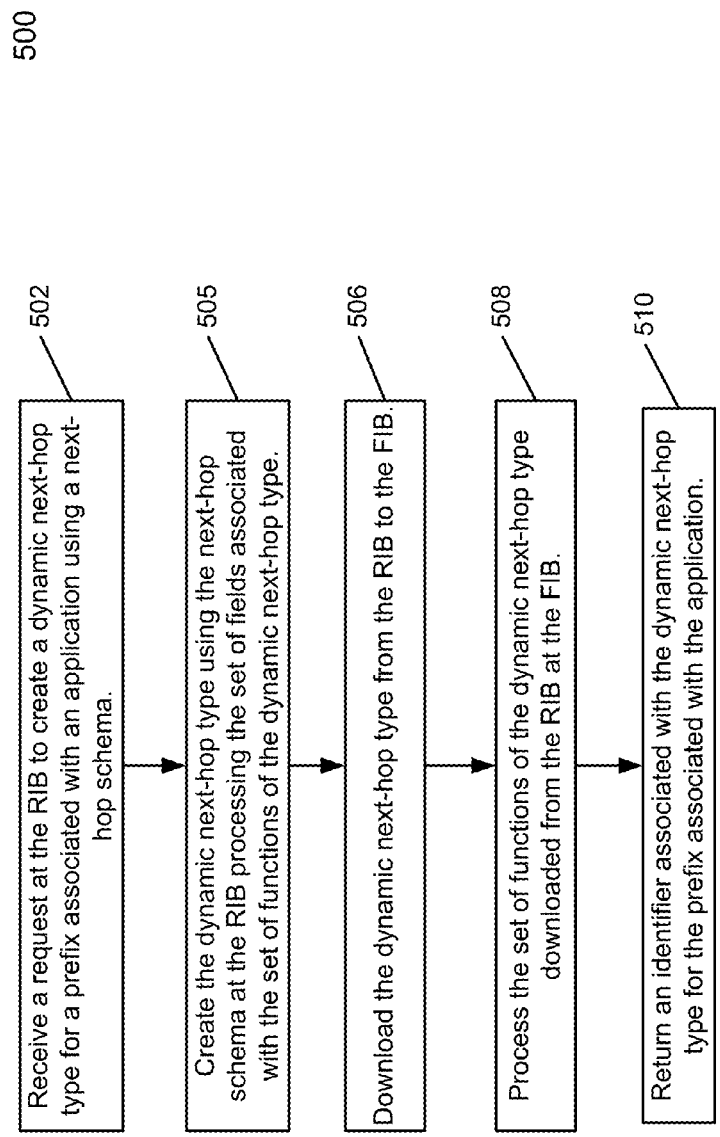
FIG. 5 is a flow diagram illustrating setting up a dynamic next-hop type according to an embodiment of the invention.

FIG. 5 is a flow diagram illustrating setting up a dynamic next-hop type according to an embodiment of the invention. The method is performed in a network with a split RIB and FIB architecture for routing. The dynamic next-hop type is for an application, and the application can be IP routing protocols (e.g., OSPF, IS-IS, ARP, ND) or IP services (e.g., packet inspection and service classification).

At block 502, a request to create a dynamic next-hop type using a next-hop schema is received at a route controller. The request is for an application and it may be sent through a message complying with one of IPv4 or IPv6 protocols. The dynamic next-hop type is for a prefix associated with the application. The dynamic next-hop type indicates a type of next-hop of the request. The next-hop schema includes a set of functions and a set of fields associated with the set of functions.

After receiving the request, a route controller creates the request dynamic next-hop type using the next-hop schema at an associated RIB, and the set of fields associated with the set of functions of the dynamic next-hop type is processed at block 504.

The created dynamic next-hop type is then downloaded from the RIB to a corresponding FIB for setting up next-hop routing at block 506. A traffic forwarder then processes the set of functions of the dynamic next-hop type downloaded from the RIB at block 508. Once the process is complete, an identifier associated with the dynamic next-hop type for the prefix associated with the application is returned at block 510.

Figure 6:
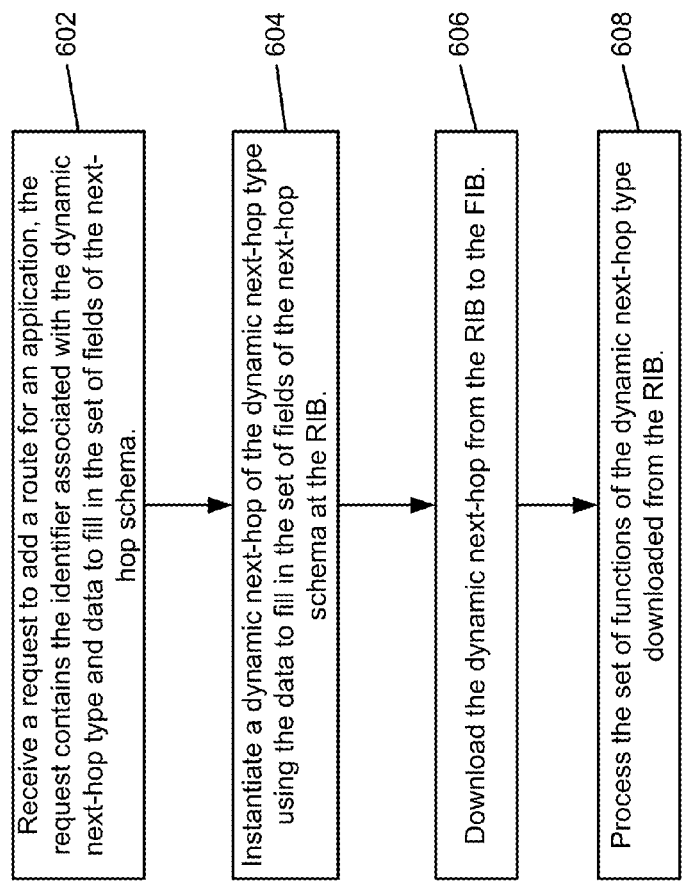
FIG. 6 is a flow diagram illustrating instantiating a dynamic next-hop type according to an embodiment of the invention.

The created dynamic next-hop type by itself cannot be utilized for next-hop routing as the next-hop schema so far does not contain data so that traffic forwarder and FIB cannot "resolve" the set of function associated with the next-hop schema. FIG. 6 is a flow diagram illustrating instantiating a dynamic next-hop type according to an embodiment of the invention. Method 600 is performed after a dynamic next-hop type has already set up. The method starts with receiving a request at a route controller to add a route for an application at block 602. The request contains the identified associated with a dynamic next-hop type that has set up already. The request also comes with data associated with the application to fill in the set of field of the next-hop schema through which the dynamic next-hop type is set up.

At block 604, the route controller instantiates a dynamic next-hop of the dynamic next-hop type using the data to fill in the set of fields of the next-hop schema at a RIB coupled to the route controller. The dynamic next-hop then is downloaded from the RIB to a corresponding FIB at block 606. A traffic forwarder then processes the set of functions of the next-hop schema using the data to fill in the set of fields of the next-hop schema at block 608. Once a packet from the application is received (identified through a prefix associated with the application), the traffic forwarder performs the set of functions of the dynamic next-hop of the dynamic next-hop type and forwards it on.

The two-step process sets up a dynamic next-hop type first using a next-hop schema and then instantiates a dynamic next-hop of the dynamic next-hop type using data to fill in the set of functions of the next-hop schema. The abstraction of the dynamic next-hop not only simplifies the design of route controller, RIB, FIB, and traffic forwarder, it also allows a third party application to be compatible with dynamic next-hop routing as the third party application may be abstracted as a set of functions associated with a schema without understanding the interwork of the route controller, RIB, FIB, and traffic forwarder. The next-hop schema becomes the common platform that a third party application can take advantage of. Indeed, if a third party application utilize a set of load DLL functions, the complexity of next-hop process will be masked until at the run-time at traffic forwarder to perform functions defined by the third party application, which can be arbitrarily complex. These greatly enhance the flexibility and reliability of next-hop routing.

Figure 7:
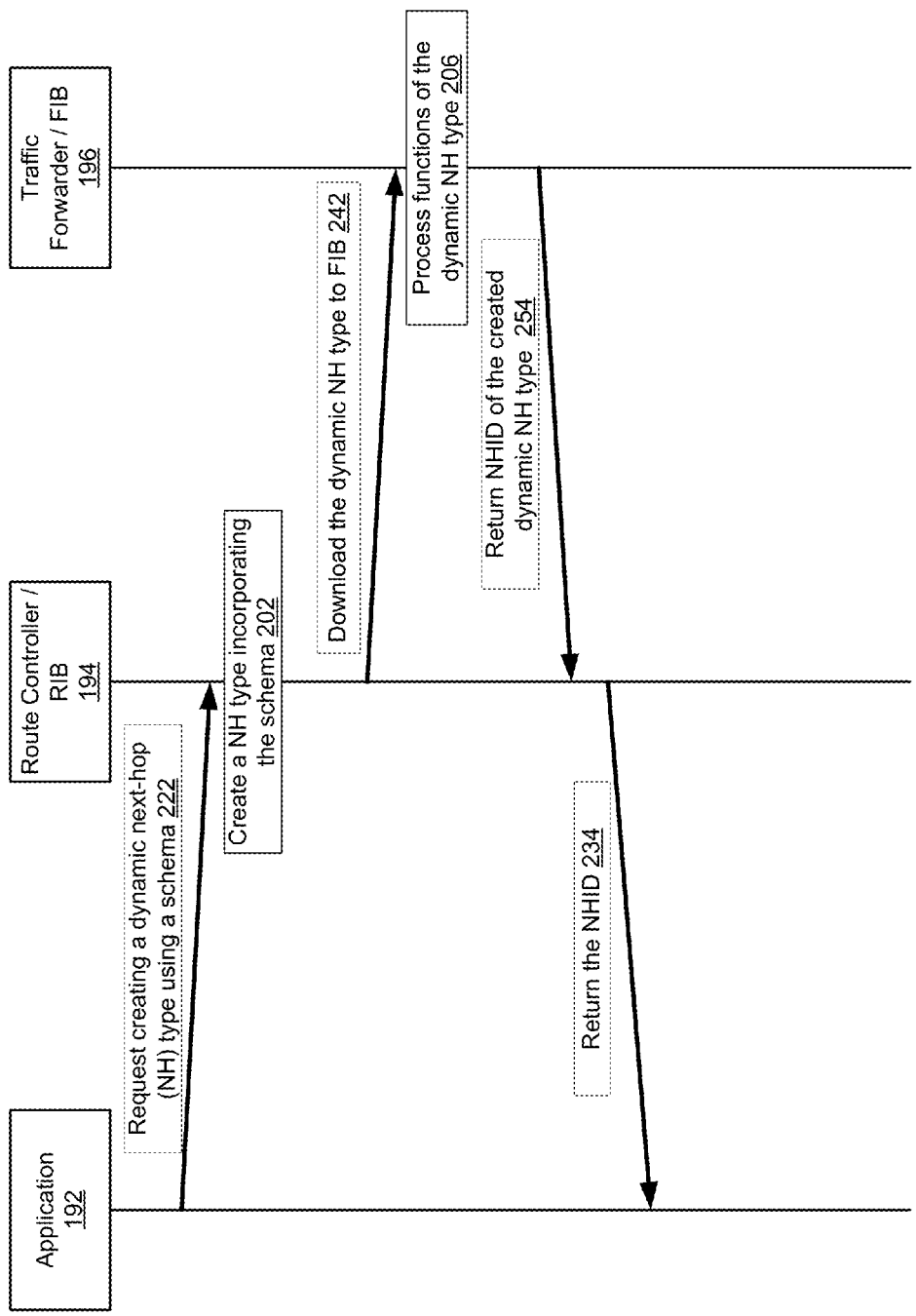
FIG. 7 illustrates a process of setting up a dynamic next-hop type according to an embodiment of the invention.

FIG. 7 illustrates a process of setting up a dynamic next-hop type according to an embodiment of the invention. FIG. 7 is similar to FIG. 2 and the same or similar references indicate elements or components having the same or similar functionalities. At reference 222, application 192 first requests a route controller and its associated RIB 194 to create a dynamic next-hop type using a schema. After receiving the request, route controller creates a next-hop type at RIB incorporating the schema at reference 202. At reference 242, the created dynamic next-hop type is downloaded from the RIB to the FIB. Then traffic forwarder processes functions of the dynamic next-hop type at reference 206. After the process complete, a next-hop identifier (NHID) associated with the created dynamic next-hop type is returned from the traffic forward/FIB 196 to the route controller/RIB 194. Route controller/RIB 194 returns the NHID to the requesting application at reference 234. The dynamic next-hop type with the NHID is then set up.

Figure 8:
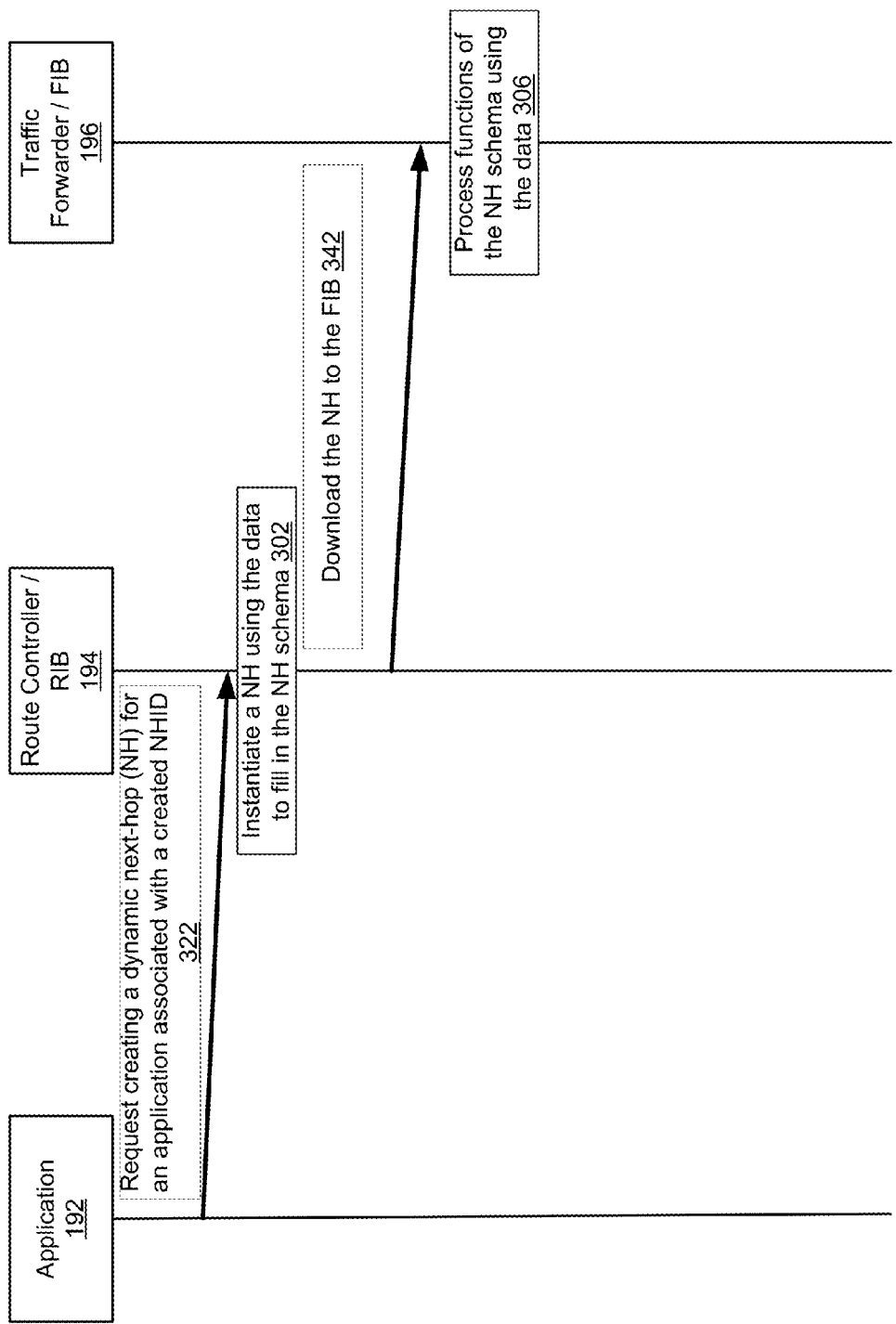
FIG. 8 illustrates a process of instantiating a next-hop of a next-hop type according to an embodiment of the invention.

FIG. 8 illustrates a process of instantiating a next-hop of a next-hop type according to an embodiment of the invention. FIG. 8 is a continuation of FIG. 7 in one embodiment, and the same or similar references indicate elements or components having the same or similar functionalities.

At reference 322, application 192 first requests the route controller and its associated RIB 194 to create a dynamic next-hop for an application associated with a created NHID. The request contains data to fill in the set of fields of the next-hop schema. Then route controller instantiates a dynamic next-hop using the data to fill in the next-hop schema at reference 302. The instantiated dynamic next-hop is then downloaded to the FIB at reference 342. Traffic forwarder then processes functions of the next-hop schema using the data at reference 306 and the dynamic next-hop is created at FIB. Afterward, a packet with a prefix associated with the application can be processed through the traffic forwarder using the set of functions of the dynamic next-hop.

Singular Network Devices Implementing Embodiments of the Invention

Figure 9:
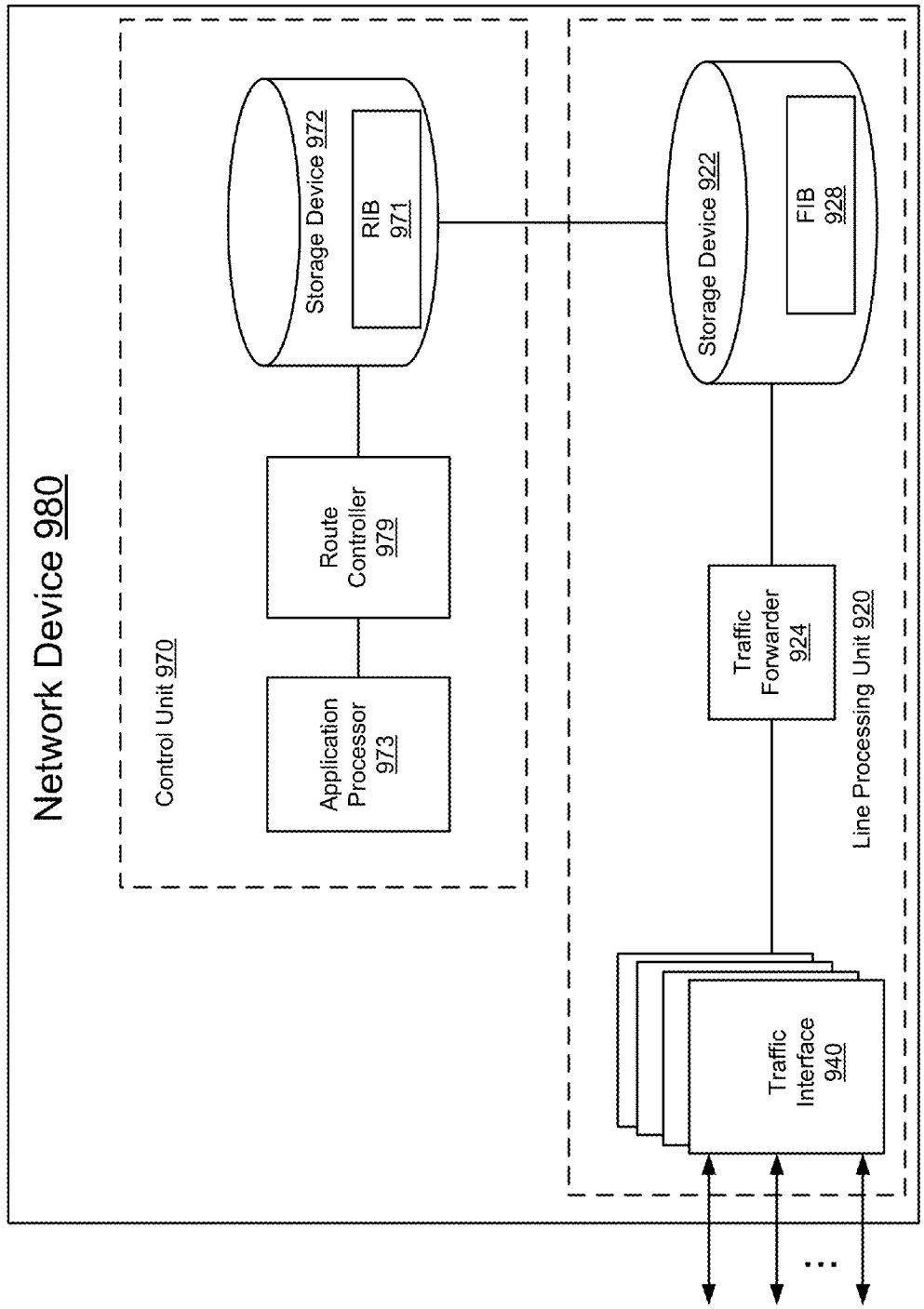
FIG. 9 illustrates a network device implementing dynamic next-hop routing according to an embodiment of the invention.

Embodiments of the inventions may be implemented in a variety of ways. FIG. 9 illustrates a network device implementing dynamic next-hop routing according to an embodiment of the invention. The various blocks may be implemented separately or integrated together with one or more other blocks to perform more or less described functions.

Functions of network device 980 are logically divided into blocks in control unit 970 and line processing unit 920. Control unit 970 generally determines how packets are supposed to be routed, and line processing unit 920 generally forwards the packets based on the determination. Note however, the functional separation between control unit 970 and line processing unit 920 differ significantly according to implementation and hardware availability, and while one separation is illustrated in FIG. 9, many other separations are feasible based on the principle disclosed herein.

Application processor 973 is in control unit 970. Application processor 973 interacts with applications requesting routes at network device 980. Applications (sometimes referred to as clients) include IP routing protocols (e.g., OSPF, IS-IS, ARP, ND) and IP services (e.g., packet inspection and service classification). Application processor 135 sends out requests for applications and receives responses for the requests. Route controller 979 is also in control unit 970. Route controller 970 provides mechanisms enabling applications to add routes. Routes are stored in the Routing Information Base (RIB) at reference 971, which is within storage device 972.

Selective routes are downloaded to the Forward Information Base (FIB) at reference 928, which is within storage device 922. Note storage devices 922 and 972 within the network device 980 can be any type of memory devices, caches, registers or similar storage devices for use as working memory and or persistent storage. Any number and variety of storage devices 922 and 972 can be utilized to store the data of the network device including programmed data and received data traffic to be processed by the network device 980.

At line processing unit 920, traffic forwarder 924 forwards packets received from traffic interface 940. Traffic forwarder 924 interacts with FIB 928 to determine where to forward the packets and what set of functions need to apply to a given packet.

In one embodiment, application processor 973 sends out a request to route controller 979 to create a dynamic next-hop type using a next-hop schema. The dynamic next-hop type is for a prefix associated with an application and the dynamic next-hop type indicates a type of next-hop of the request. The next-hop schema includes a set of functions and a set of fields associated with the set of functions.

Route controller 979 receives the request, and it creates the dynamic next-hop type using the next-hop schema at RIB 971. The set of fields associated with the set of functions of the dynamic next-hop type is processed. The created dynamic next-hop type is then downloaded to FIB 928. Then traffic forwarder 924 processes the set of functions of the dynamic next-hop and set up the dynamic next-hop at FIB 928. After the setup completes, it returns an identifier associated with the dynamic next-hop type (referred to as next-hop identifier, NHID) for the prefix associated with the application.

In one embodiment, after receiving the NHID, application processor may send a request to route controller 979 to add a route for the application. The request contains the NHID and it also contains data to fill in the set of fields of the next-hop schema utilized to create the dynamic next-hop schema. After receiving the request to add the route, route controller 979 instantiates a dynamic next-hop of the dynamic next-hop type using the data to fill in the set of fields of the next-hop schema at RIB 971. The instantiated dynamic next-hop is ten downloaded from RIB 971 to FIB 928. Traffic forwarder 924 then processes the set of functions of the next-hop schema using the data to fill in the set of fields of the next-hop schema. Once a packet from the application (identified through the prefix) passes through traffic interface 940 to traffic forwarder 924, traffic forwarder 924 performs the set of functions of the dynamic next-hop and forwards the traffic out of network device 980.

Figure 10:
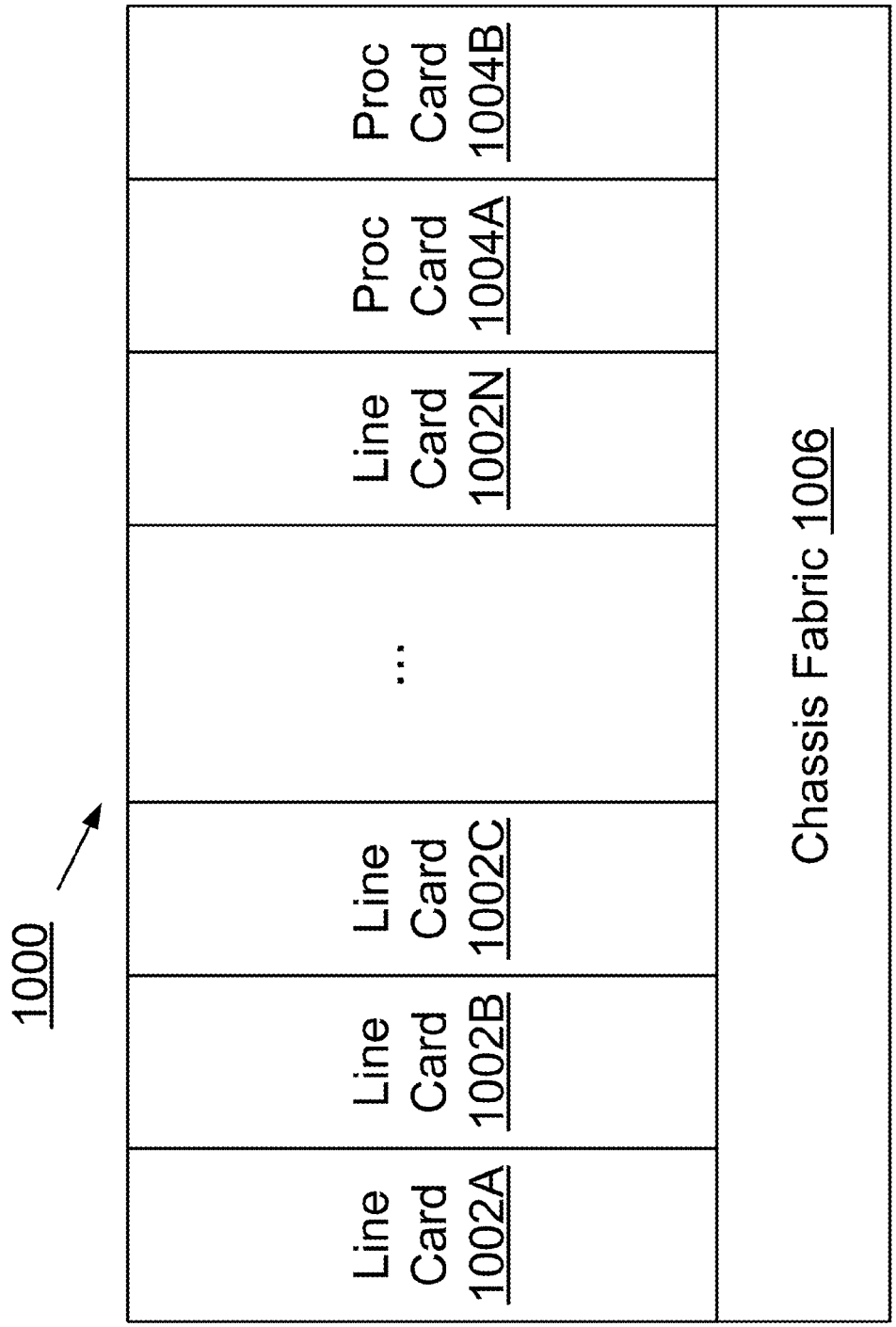
FIG. 10 illustrates a network device incorporating the method of dynamic next-hop routing according to one embodiment of the invention.

FIG. 10 illustrates a network device incorporating the method of dynamic next-hop routing according to one embodiment of the invention. While in one embodiment of the invention chassis fabric 1006 is coupled to line cards 1502A-N and processing cards 1004A-B, other embodiments of the invention describe multiple other devices and/or modules coupled to chassis fabric 1006. While in one embodiment, route controller 979 may be part of processing cards 1004A-B and traffic forwarder 924 may be part of line cards 1002A-N, alternate embodiments may have alternate card arrangements (a combined line and processing card with one or more ports and a traffic forwarder, one processing card per line card, multiple processing cards per line card, etc.). Network device 1000 includes line cards 1002A-N to forward packets.

Note network devices having other architectural configurations can incorporate embodiments of the invention. Examples of other network devices that could incorporate embodiments of the invention may have multiple line cards or have a single line card incorporating the functionality of both the forwarding and the controlling. Moreover, a network device having the forwarding functionality distributed across the traffic cards could incorporate embodiments of the invention.

The line cards 1002A-N and processor cards 1004A-B included in the different network devices and performing route controlling include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

A Plurality of Network Devices Implementing Embodiments of the Invention

Figure 11:
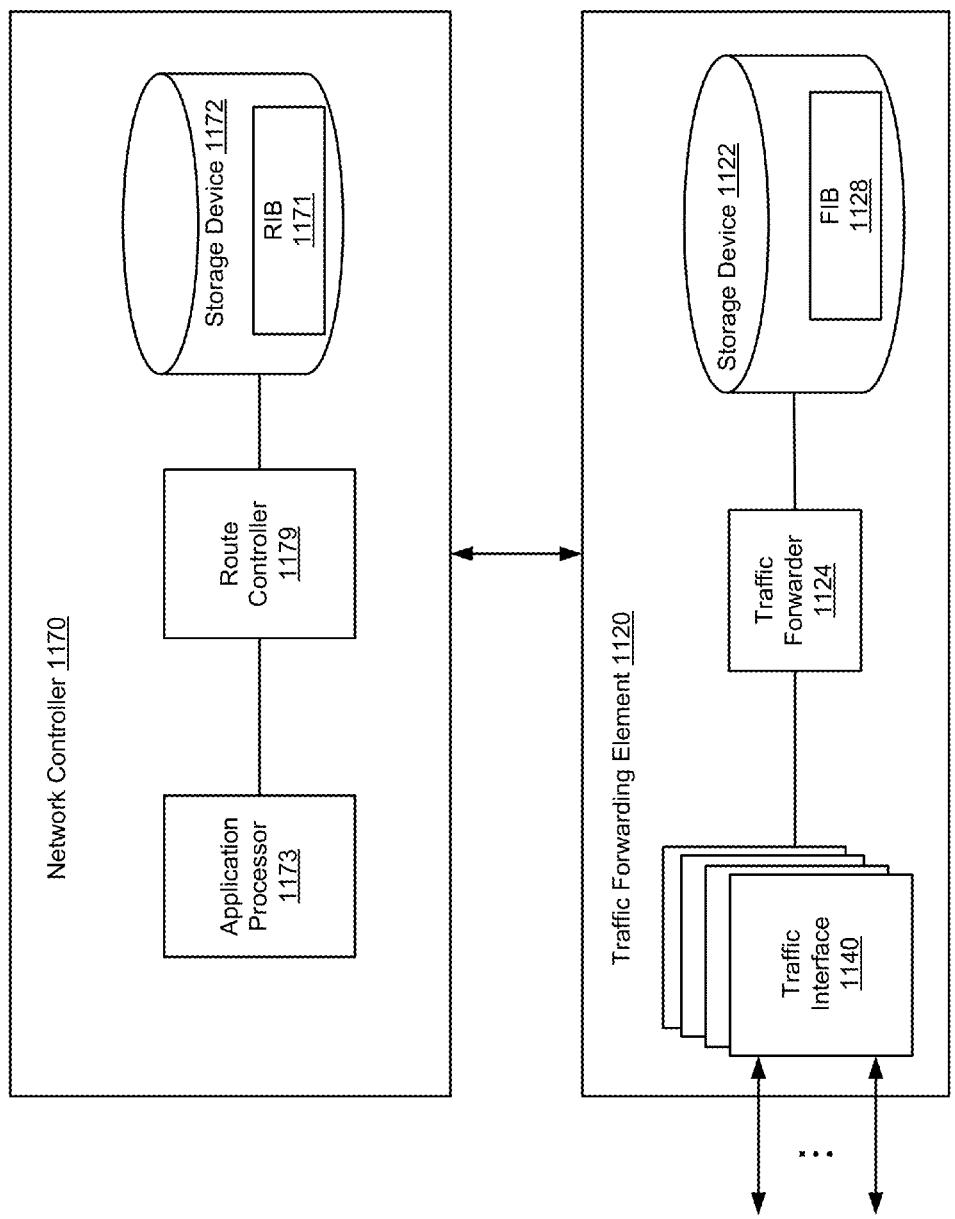
FIG. 11 illustrates a plurality of network devices implementing dynamic next-hop routing according to an embodiment of the invention.

While a singular network device may perform the method of dynamic next-hop routing, a split architecture may also be used to implement the method. FIG. 11 illustrates a plurality of network devices implementing dynamic next-hop routing according to an embodiment of the invention. FIG. 11 includes network controller 1170 and traffic forwarding element 1120. Note functional blocks of FIG. 11 are the same as FIG. 9, and similarly named blocks have the same or similar functionalities.

Network controller 1170 includes application processor 1173, route controller 1179, and storage device 1172 containing RIB 1171. Network controller 1170 performs operations similar to control unit 970 of FIG. 9. Traffic forwarding element 1120 includes traffic 1140, traffic forwarder 1124, and storage device 1122 containing FIB 1128. Traffic forwarding element 1120 performs operations similar to line processing unit 920 of FIG. 9. The operations are described in detail herein above.

Figure 12:
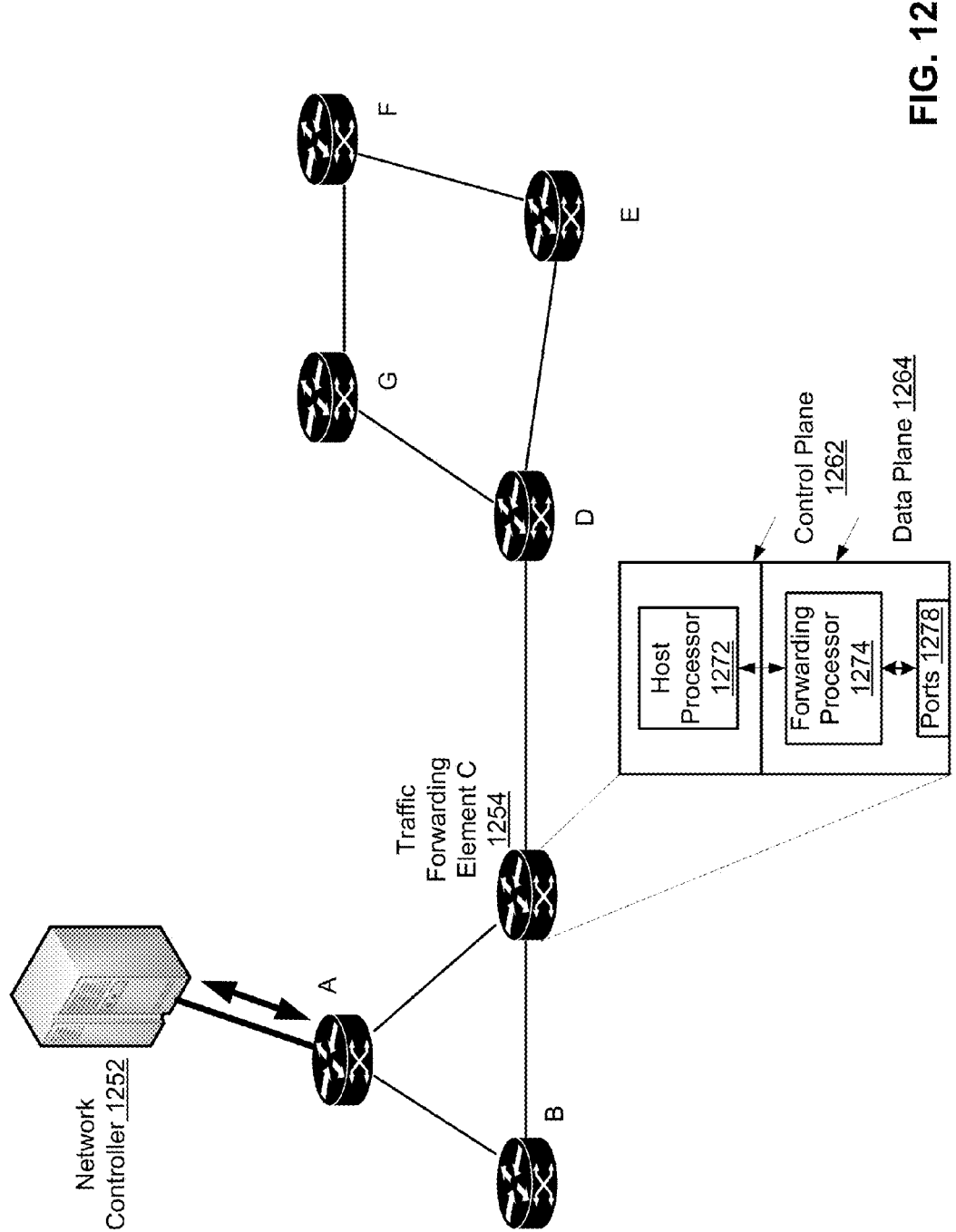
FIG. 12 illustrates a split architecture implementing dynamic next-hop routing according to an embodiment of the invention.

FIG. 12 illustrates a split architecture implementing dynamic next-hop routing according to an embodiment of the invention. Network 1200 comprises a number of traffic forwarding elements A-G and network controller 1252. Network controller 1252 and traffic forwarding elements (e.g., C at reference 1254) perform same or similar functions as the network controller 1170 and traffic forwarding element 1120 of FIG. 11. Network controller 1252 and traffic forwarding elements may be implemented in compliance with a software defined networking (SDN) standard such as OpenFlow.

The main task of traffic forwarding element (referred to as an OpenFlow switch or simply switch in OpenFlow parlance when the SDN complies with OpenFlow standards), is to forward packets within the SDN forwarding element from an ingress port to an egress port, according to the rules in flow tables programmed by one or more SDN controllers. Each flow entry contains a set of actions such as forwarding packets to a given port, modifying certain bits in a packet header, encapsulating packets to the network controller, or dropping the packets. For the first packet in a new flow, the forwarding element often forwards the packet to the network controller to trigger the new flow being programmed and new dynamic next-hop route being set. It can also be used to forward slow-path packets such as Internet Control Message Protocol (ICMP) packets to the SDN controller for processing. Note that the concept of a flow can be defined broadly, e.g., a TCP connection, or all traffic from a particular MAC address or IP address. Also note that a packet within network 1200 is defined broadly and it may be an Ethernet frame, an IP network packet, or a message in a proprietary format.

Network controller 1252 adds and removes flow-entries from a flow table. It defines the interconnection and routing among a set of traffic forward elements and other network devices. It also handles network state distribution, such as collecting information from the set of traffic forward elements and distributing forwarding/routing instructions to them. Network controller 1252 can also be programmed to support new addressing, routing, and complex packet processing applications. The network controller 1252 is the "brains" of network 1200. A forwarding element needs to connect to at least one SDN controller to function correctly.

In one embodiment, traffic forwarding element can be viewed logically as containing two main components. One is a control plane and the other is a data plane (or forwarding plane). A zoom-in view of traffic forwarding element C at reference 1254 illustrates the two planes. Traffic forwarding element C contains control plane 1262 and data plane 1264. Control plane 1262 coordinates management and configuration of traffic forwarding element C. Configuration of data plane 1264 is achieved by running applications on host processor 1272. Host processor 1272 usually runs an operating system in order to provide a well-known development environment. Commands from host processor 1272 are sent to the forwarding processor 1274 using an interconnect (e.g., a peripheral component interconnect (PCI) bus). Exception packets (e.g., packet for routing and management) are often processed on host processor 1272. Forwarding processor 1274 interacts with various forwarding ports 1278 of traffic forwarding element C to forward and otherwise process incoming and outgoing packets.

Data plane 1264 is responsible for forwarding traffic (forwarding operations includes switching, routing, learning, etc.). It contains forwarding processor 1274 that is designed to provide high throughput at the detriment of a more complex and flexible development environment. Different types high performance memory and hardware accelerator are often found on board of forwarding processor 1274 for achieving the high throughput. In contrast, host processor 1272 can be more complex and flexible at the detriment of providing high throughput as it processes more control packets (often referred to as slow path packets) than data packet thus throughput is less mission critical. When traffic forwarding element C receives a packet associated with a new flow, it does not know where to forward the packet. Thus it sends the packet to its managing network controller, network controller 1252 in this example. Network controller 1252 receives the packet, and it programs a new flow entry based on its associated prefix and dynamic next-hop. It then sends the new flow entry to traffic forwarding element C. Traffic forwarding element C then forwards the packet according to the new flow entry.

While the invention has been described in terms of several example embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented on a network device, wherein the network device contains a routing information base (RIB) and a forwarding information base (FIB), wherein the RIB contains routing information to map routes to a set of next-hops, wherein the FIB contains forwarding information for the network device to forward traffic flows to next-hops, the method comprising:

receiving a request to create a dynamic next-hop type using a next-hop schema, wherein the dynamic next-hop type is for a prefix associated with an application, wherein the dynamic next-hop type indicates a type of next-hop of the request, wherein the next-hop schema includes a set of functions and a set of fields associated with the set of functions;

creating the dynamic next-hop type using the next-hop schema at the RIB, wherein the set of fields associated with the set of functions of the dynamic next-hop type is processed;

downloading the dynamic next-hop type from the RIB to the FIB;

processing the set of functions of the dynamic next-hop type downloaded from the RIB at the FIB;

returning an identifier associated with the dynamic next-hop type for the prefix associated with the application once processing the set of functions of the dynamic next-hop at the FIB is complete;

receiving a request to add a route for the application, wherein the request contains the identifier associated with the dynamic next-hop type and data to fill in the set of fields of the next-hop schema;

instantiating a dynamic next-hop of the dynamic next-hop type using the data to fill in the set of fields of the next-hop schema at the RIB;

downloading the dynamic next-hop from the RIB to the FIB; and processing the set of functions of the next-hop schema using the data to fill in the set of fields of the next-hop schema, wherein upon a packet from the application being received at the network device, performing the set of functions of the dynamic next-hop of the dynamic next-hop type.

2. The method of claim 1, wherein the set of functions of the next-hop schema includes forwarding constructs.

3. The method of claim 1, wherein the set of functions of the next-hop schema includes conditional operations and loops.

4. The method of claim 1, wherein the set of functions of the next-hop schema includes a dynamic linked library.

5. The method of claim 1, wherein the set of functions are processed in a predetermined order specified by one or more functions within the set of functions.

6. The method of claim 1, wherein the application is one of open shortest path first (OSPF), intermediate system to intermediate system (IS-IS), address resolution protocol (ARP), neighbor discovery (ND) protocol, and IP services.

7. A network device containing a routing information base (RIB) and a forwarding information base (FIB), wherein the RIB contains routing information to map routes to a set of next-hops, wherein the FIB contains forwarding information for the network device to forward traffic flows to next-hops, the network device comprising:

an application processor configured to send a request to create a dynamic next-hop type using a next-hop schema, wherein the dynamic next-hop type is for a prefix associated with an application, wherein the dynamic next-hop type indicates a type of next-hop of the request, and wherein the next-hop schema includes a set of functions and a set of fields associated with the set of functions; and the application processor is further configured to send a request to add a route for the application, wherein the request contains an identifier associated with the dynamic next-hop type and data to fill in the set of fields of the next-hop schema;

a route controller configured to receive the request, the route controller further configured to receive the request to add the route, and to instantiate a dynamic next-hop of the dynamic next-hop type using the data to fill in the set of fields of the next-hop schema at the RIB;

a first storage device coupled with the route controller, wherein the first storage device contains the RIB, where the route controller is further configured to create the dynamic next-hop type using the next-hop schema at the RIB, and wherein the set of fields associated with the set of functions of the dynamic next-hop type is processed;

a second storage device coupled with the first storage device, wherein the second storage device contains the FIB, wherein the FIB is configured to download the dynamic next-hop type, the second storage device is further configured to download the dynamic next-hop from the RIB to the FIB; and a traffic forwarder coupled with the second storage device, wherein the traffic forwarder is configured to return the identifier associated with the dynamic next-hop type for the prefix associated with the application once processing the set of functions of the dynamic next-hop at the FIB is complete, the traffic forwarder is further configured to process the set of functions of the next-hop schema using the data to fill in the set of fields of the next-hop schema, wherein upon a packet from the application being received at the network device, the traffic forwarder is to perform the set of functions of the dynamic next-hop of the dynamic next-hop type.

8. The network device of claim 7, wherein the set of functions of the next-hop schema includes forwarding constructs.

9. The network device of claim 7, wherein the set of functions of the next-hop schema includes conditional operations and loops.

10. The network device of claim 7, wherein the set of functions of the next-hop schema includes a dynamic linked library.

11. The network device of claim 7, wherein the set of functions are processed in a predetermined order specified by one or more functions within the set of functions.

12. The network device of claim 7, wherein the application is one of open shortest path first (OSPF), intermediate system to intermediate system (IS-IS), address resolution protocol (ARP), neighbor discovery (ND) protocol, and IP services.

13. A method implemented in a network including a network controller and a traffic forwarding element containing a routing information base (RIB) and a forwarding information base (FIB) respectively, wherein the RIB contains routing information to map routes to a set of next-hops, wherein the FIB contains forwarding information for the traffic forwarding element to forward traffic flows to next-hops, the method comprising:

receiving a request at the network controller to create a dynamic next-hop type using a next-hop schema, wherein the dynamic next-hop type is for a prefix associated with an application, wherein the dynamic next-hop type indicates a type of next-hop of the request, wherein the next-hop schema includes a set of functions and a set of fields associated with the set of functions;

creating the dynamic next-hop type using the next-hop schema at the RIB, wherein the set of fields associated with the set of functions of the dynamic next-hop type is processed;

downloading the dynamic next-hop type from the RIB to the FIB;

processing at the traffic forwarding element the set of functions of the dynamic next-hop type downloaded from the RIB at the FIB;

returning an identifier associated with the dynamic next-hop type for the prefix associated with the application once processing the set of functions of the dynamic next-hop at the FIB is complete;

receiving a request to add a route for the application, wherein the request contains the identifier associated with the dynamic next-hop type and data to fill in the set of fields of the next-hop schema;

instantiating a dynamic next-hop of the dynamic next-hop type using the data to fill in the set of fields of the next-hop schema at the RIB;

downloading the dynamic next-hop from the RIB to the FIB; and processing the set of functions of the next-hop schema using the data to fill in the set of fields of the next-hop schema, wherein upon a packet from the application being received at the traffic forwarding element, performing the set of functions of the dynamic next-hop of the dynamic next-hop type.

14. A plurality of network devices coupled to a network, the plurality of network devices includes a network controller and a traffic forwarding element containing a routing information base (RIB) and a forwarding information base (FIB) respectively, wherein the RIB contains routing information to map routes to a set of next-hops, wherein the FIB contains forwarding information for the traffic forwarding element to forward traffic flows to next-hops, the network controller comprising:

an application processor configured to send a request to create a dynamic next-hop type using a next-hop schema, wherein the dynamic next-hop type is for a prefix associated with an application, wherein the dynamic next-hop type indicates a type of next-hop of the request, and wherein the next-hop schema includes a set of functions and a set of fields associated with the set of functions; and the application processor of the network controller is further configured to send a request to add a route for the application, wherein the request contains an identifier associated with the dynamic next-hop type and data to fill in the set of fields of the next-hop schema;

a route controller configured to receive the request, the route controller further configured to instantiate a dynamic next-hop of the dynamic next-hop type using the data to fill in the set of fields of the next-hop schema at the RIB;

a first storage device coupled with the route controller, wherein the first storage device contains the RIB, where the route controller is further configured to create the dynamic next-hop type using the next-hop schema at the RIB, and wherein the set of fields associated with the set of functions of the dynamic next-hop type is processed; and the traffic forwarding element comprising:

a second storage device coupled with the first storage device, wherein the second storage device contains the FIB, wherein the FIB is configured to download the dynamic next-hop type; and wherein the second storage device of the traffic forwarding element is further configured to download the dynamic next-hop from the RIB to the FIB; and a traffic forwarder coupled with the second storage device, wherein the traffic forwarder is configured to return the identifier associated with the dynamic next-hop type for the prefix associated with the application once processing the set of functions of the dynamic next-hop at the FIB is complete, wherein the traffic forwarder further configured to process the set of functions of the next-hop schema using the data to fill in the set of fields of the next-hop schema, and wherein upon a packet from the application being received at the traffic forwarding element, the traffic forwarder performs the set of functions of the dynamic next-hop of the dynamic next-hop type.

* * * * *

UNITED STATES PATENT AND TRADEMARK OFFICE
CERTIFICATE OF CORRECTION

PATENT NO. : 9,253,086 B2
APPLICATION NO. : 13/938104
DATED : February 2, 2016
INVENTOR(S) : Ramanathan et al.

It is certified that error appears in the above-identified patent and that said Letters Patent is hereby corrected as shown below:

In the Specification

In Column 14, Line 6, delete "and or" and insert -- and/or --, therefor.

In Column 15, Line 23, delete "etc.);" and insert -- etc.) --, therefor.

Signed and Sealed this
Tenth Day of May, 2016

Michelle K. Lee
*Director of the United States Patent and Trademark Office*